United States Patent [19]

Engelmann et al.

[11] Patent Number: 4,636,547
[45] Date of Patent: Jan. 13, 1987

[54] SINTERABLE, FINELY PARTICULAR MOLDING COMPOSITION BASED ON VINYL CHLORIDE POLYMERS

[75] Inventors: Manfred Engelmann; Helmut Kraus, both of Burgkirchen; Otto Plewan, Neuötting, all of Fed. Rep. of Germany

[73] Assignee: Hoechst Aktiengesellschaft, Fed. Rep. of Germany

[21] Appl. No.: 756,970

[22] Filed: Jul. 19, 1985

[30] Foreign Application Priority Data

Jul. 21, 1984 [DE] Fed. Rep. of Germany ....... 3426929

[51] Int. Cl.$^4$ ......................... C08L 27/06; C08L 51/00
[52] U.S. Cl. ..................................... 524/523; 524/186; 524/236; 524/504; 521/919; 525/80; 525/85; 525/227; 525/239; 264/126; 264/331.18
[58] Field of Search .................. 525/239, 227, 85, 80; 521/919; 524/523

[56] References Cited

U.S. PATENT DOCUMENTS

| | | | |
|---|---|---|---|
| 2,868,763 | 1/1959 | Montgomery | 525/227 |
| 3,865,799 | 2/1975 | Katagiris et al. | 521/919 |
| 4,546,135 | 10/1985 | Engelmann et al. | 524/158 |

FOREIGN PATENT DOCUMENTS

| | | | |
|---|---|---|---|
| 111917 | 6/1984 | European Pat. Off. | |
| 2127654 | 6/1970 | Fed. Rep. of Germany | 521/919 |
| 51-017944 | 2/1976 | Japan | 521/919 |
| 2098129 | 11/1982 | United Kingdom | 521/919 |

OTHER PUBLICATIONS

Kainer, *Polyvinylchlorid und Vinylchlorid-Mischpolymerisate*, Springer-Verlag Berlin, 1965, pp. 35-46.
*Roempps Chemie-Lexicson*, 7th Ed., ed. by Neumueller, Frankh'sche Verlagshandlung Stuttgart, 1973, vol. 3 H-L, p. 1478.
*Ulmanns Encyklopaedia der technischen Chemie*, 4th Ed., vol. 22, 1982, pp. 467-500.

Primary Examiner—Carman J. Seccuro
Attorney, Agent, or Firm—Connolly and Hutz

[57] ABSTRACT

A molding composition which is essentially composed of a mixture of at least two polymers based on vinyl chloride and at least one water-soluble surfactant is described. One of the polymers is a sinterable vinyl chloride/alkyl acrylate copolymer which can contain, in addition, polymerized units of vinyl acetate and ethylene. At least one further polymer is a vinyl chloride polymer which can contain up to 5% by weight of polymerized units of vinyl acetate and ethylene. The molding composition is suitable for the production of sintered, porous, flexible moldings, in particular separator compartments for electric cells.

10 Claims, No Drawings

SINTERABLE, FINELY PARTICULAR MOLDING COMPOSITION BASED ON VINYL CHLORIDE POLYMERS

The invention relates to a molding composition comprising essentially a mixture of a sinterable vinyl chloride/alkyl acrylate copolymer produced by suspension polymerization, at least one further sinterable vinyl chloride polymer and at least one surfactant.

It is known to employ polyvinyl chloride for the production of sintered moldings, for example separator plates for electric cells. Appropriate molding compositions have been described in U.S. Pat. Nos. 3,766,106; 3,951,883; 4,137,381; 4,206,298 and 4,323,661.

All these molding compositions produce porous sintered moldings, for example separator plates, which are comparatively hard and stiff, so that they break, wholly or partly, when bent round a solid edge, even at bending angles less than 120°. Materials of this type are unsuitable for the production of so-called separator compartments, since flexible plates which display no cracks even when bent through 180° are required for this purpose.

Flexible porous plates of this type can be produced from molding compositions such as are described in European Patent Application No. 111,917, but the plates thus produced are limp and have a reduced tensile strength, which makes it difficult to convert them into the separator plates. Furthermore, the sintering temperature range of such molding compositions is narrower, as a result of which it becomes more difficult to achieve a specific desired volume resistance in the plates when they are sintered. In the event of local overheating in the sintering machine, undesirably large holes can be formed in the plates, rendering the latter unusable as separators.

It has now been found, surprisingly, that a mixture of a sinterable polymer as specified in European Published Application No. 111,917 with another sinterable polymer based on vinyl chloride which, processed on its own, produces sintered plates which are not flexible and display completely inadequate bending angles, results in molding compositions which produce sintered, porous plates having improved bending angles as well as good stiffness and tensile strength. A mixture of this type is also less sensitive when sintered than the unmixed, sinterable polymers as specified in European Published Application No. 111,917.

The new sinterable, finely particular molding composition comprises essentially a mixture of at least two polymers based on vinyl chloride and at least one surfactant, in which each of the polymers has a K-value of 55 to 90 and the polymer mixture has an average particle size of 10 to 50 μm, a bulk density of 400 to 700 g/dm³ and a particle size distribution of:

99 to 30% by weight, relative to the mixture, <33 μm,
1 to 60% by weight, relative to the mixture, from 33 to 63 μm
0 to 9% by weight, relative to the mixture, from 63 to 125 μm and
0 to 1% by weight, relative to the mixture, >125 μm, and the mixture contains:

(I) 95 to 10% by weight, relative to the mixture, of a sinterable copolymer or graft copolymer prepared by suspension polymerization in an aqueous phase and in which the polymer component is composed of:

(a) 90 to 70% by weight of polymerized units of vinyl chloride,
(b) 10 to 30% by weight of polymerized units of at least one alkyl acrylate having 3 to 10 carbon atoms in the alkyl group,
(c) 0 to 7% by weight of polymerized units of ethylene and
(d) 0 to 15% by weight of polymerized units of vinyl acetate, subject to the proviso that the amount of (d) is at least 3/7 of the amount of (c) and that the sum of the amounts of (b) plus (c) plus (d) is 10 to 30% by weight; and also (II) 5 to 90% by weight, relative to the mixture, of at least one sinterable polymer in which the polymer component is composed of:

(α) 100 to 95% by weight of polymerized units of vinyl chloride,
(β) 0 to 5% by weight of polymerized units of ethylene and
(γ) 0 to 5% by weight of polymerized units of vinyl acetate, subject to the proviso that the amount of (γ) is at least 3/7 of the amount of (β) and that the amount of (β) plus (γ) is 0 to 5% by weight of the polymer component; and also (III) 0.05 to 5% by weight, relative to the mixture, of at least one water-soluble surfactant which can be a constituent of one or more polymers described above under I and/or II, subject to the proviso that the amounts of I plus II plus III add up to 100% by weight of mixture.

Above 95% by weight of component I the mixture displays no improvement over the pure component I; below 10% by weight the plates produced are not adequately flexible and cracks occur when separator compartments are produced. The mixture of polymers preferably contains 60 to 25% by weight of the component I.

The component I is a vinyl chloride/alkyl acrylate copolymer which can contain vinyl acetate as a further comonomer and/or can contain constituents grafted onto an ethylene/vinyl acetate copolymer. If less than 10% by weight of polymerized units of an alkyl acrylate are present in this copolymer, adequate flexibility in the sintered moldings is not achieved by means of the polymer mixture. If the component I is composed of more than 30% by weight of polymerized units of an alkyl acrylate, difficulties occur in sintering which substantially impede, or even render impossible, the production of plates of a specific desired volume resistance. The component I preferably contains 15 to 25% by weight of alkyl acrylate. The alkyl group in the alkyl acrylate should have 3 to 10 carbon atoms. Esters containing alkyl groups of less than 3 and more than 10 carbon atoms do not produce adequate flexibility in the sintered moldings. Suitable alkyl acrylates are those having glass transition temperatures (Tg) of 203 to 248 K as homopolymers, and it is preferable to use esters in which the alkyl group contains 4 to 8 carbon atoms.

If the component I only contains polymerized units of vinyl chloride and alkyl acrylate, it is still possible to obtain flexible sintered moldings, for example separator plates for electric cells, having good properties. These can be improved further if the polymer component of the component I additionally contains polymerized units of vinyl acetate. A further improvement can be observed if the polymer component of the component I contains polymerized units of vinyl acetate and of ethylene, subject to the proviso that the amount of polymerized vinyl acetate units is at least 3/7 of the amount of polymerized ethylene units. If the content of polymerized units of vinyl acetate is less than 3/7 of the amount of polymerized units of ethylene, difficulties occur in the preparation of the component I, lumps are formed during the polymerization and the desired uniformity in the polymer elements produced, which, in turn, results in uniform pore size distribution in the sintered molding, is not achieved.

Portions of polymerized vinyl acetate units higher than 15% by weight in the component I have an adverse effect on the flexibility of the sintered moldings. Good results are obtained if the polymer component of the component I contains 0.3 to 11% by weight of polymerized units of vinyl acetate. The vinyl acetate is employed firstly as such and secondly also in the form of a copolymer with ethylene in a 70:30 to 30:70 ratio by weight, for the polymerization of vinyl chloride in order to prepare the component I.

If the polymer component of the component I contains more than 7% by weight of polymerized units of ethylene, the particle size becomes non-uniform. It then becomes difficult to maintain, in the polymer mixture according to the invention, the particle size distribution which is required for the production of sintered separator plates. The polymer component of the component I preferably contains 0.3 to 2.5% by weight of polymerized units of ethylene.

The component I is prepared as described in European Published Application No. 111,917, page 10, line 18 to page 17, line 9. It is also possible to carry out this polymerization without an emulsifier if it is possible, as the result of appropriate agitation of the polymerization mixture, to achieve a particle size distribution such as is described earlier in the text. If an emulsifier acid is not employed in the polymerization, it is advantageous to add to the batch, after the polymerization, but before the polymer is dried, about 0.01 to 5% by weight, relative to the dry polymer, of an acid having a pKa value in aqueous solution at 20° C. of not more than 3.

The component II of the polymer mixture according to the invention can be composed of one or more sinterable polymers in which the polymer component is composed of 100 to 95% by weight of polymerized units of vinyl chloride, 0 to 5% by weight of polymerized units of ethylene and 0 to 5% by weight of polymerized units of vinyl acetate, subject to the proviso that the amount of polymerized units of vinyl acetate is at least 3/7 of the amount of polymerized units of ethylene and that the sum of the polymerized units of ethylene and of vinyl acetate is 0 to 5% by weight of the polymer component. Vinyl chloride homopolymers produced by emulsion, suspension or mass polymerization can be used as the component II, also copolymers having up to 5% by weight of polymerized units of vinyl acetate as well as graft polymers containing an ethylene/vinyl acetate copolymer as the graft base.

The polymers employed as the component II can be prepared by conventional processes or, for example, as described in U.S. Pat. Nos. 3,951,883; 4,137,381; 4,206,298 or 4,323,661.

If the polymers used as the component II are polymerized by the suspension or mass process, it is possible to dispense with the addition of an emulsifier, if it is possible, as the result of appropriate agitation of the reaction mixture, to achieve a particle size distribution such as is described in greater detail above. If the polymer is produced by suspension polymerization, the use of an emulsifier acid, such as is described, for example, in U.S. Pat. Nos. 3,951,883; 4,206,298 and 4,323,661, can be dispensed with, if 0.01 to 5% by weight, relative to dry polymer, of an acid having a pKa value in aqueous solution at 20° C. of not more than 3 is added to the batch, advantageously after the completion of polymerization, but before drying.

Polymers which are sinterable must be employed both as the component I and also as the component II of the polymer mixture according to the invention. As defined in the present invention, a polymer is "sinterable" if, when deposited on a surface in a uniform layer 0.4 mm thick and subsequently sintered for 2 to 4 minutes in hot air at 225° C., it produces plates meeting the following requirements:

| tensile strength | at least 3 N/mm$^2$ |
| --- | --- |
| elongation at break | at least 3% |
| porosity | at least 5 cm$^3$/ 100 g of sample |
| maximum pore size | not more than 75 μm |

More precise details relating to the methods of measurement are given later in the text.

Particularly good results are obtained if 30 to 80% by weight of the component II are employed in the mixture of polymers. The use, as component II, of a vinyl chloride polymer in which the polymer component is composed of 100% by weight of polymerized units of vinyl chloride is preferred for economic reasons and because of the good quality of the resulting sintered moldings.

The polymer mixture contains 0.05 to 5% by weight, relative to the mixture, of at least one surfactant. Below 0.05% by weight it is only possible to obtain from the polymer mixture sintered articles which do not have the desired pattern of properties; above 5% by weight no improvement in properties is observed, but frequently even a deterioration, for which reason higher added amounts are unnecessary. The polymer mixture preferably contains 0.05 to 2% by weight of at least one surfactant. This surfactant or these surfactants can be a constituent of the polymer(s) present as component I and/or component II in the polymer mixture. In the preparation of the polymer, the surfactant content of the polymer(s) can have been added before, during or after the polymerization, as described, for example, in U.S. Pat. Nos. 3,951,883; 4,137,381 4,206,298 and 4,323,661 and in European Published Application No. 111,917. Surfactants and their preparation are described, for example, in Ullmanns "Enzyklopädie der technischen Chemie" ["Ullmann's Encyclopedia of Industrial Chemistry"], 4th edition, volume 22 (1982), page 467, right-hand column to page 500, left-hand column.

It is preferable to employ surfactants which are surface-active emulsifiers suitable for the polymerization of VC. Emulsifiers of this type are described, for example, in H. Kainer "Polyvinylchlorid und Vinylchlorid-Mischpolymerisate" ["Polyvinyl Chloride and Vinyl Chloride Copolymers"], Springer Verlag/Berlin, 1965, middle of page 35 to top of page 46; emulsifiers having an HLB value between 10 and 40 are particularly suitable. The HLB value can be determined by various methods, see Römpp's Chemie Lexikon ["Chemical Dictionary"], 7th edition, Stuttgart 1973, volume 3 H - L, page 1478, right-hand column.

The following are examples of suitable emulsifiers: alkali metal, alkaline earth metal or ammonium salts of fatty acids, such as lauric, palmitic or stearic acid; of acid fatty alcohol sulfuric acid esters and of sulfosuccinic acid dialkyl esters, and also the alkali metal and ammonium salts of fatty acids containing epoxy groups, such as epoxy stearic acid, of reaction products of peracids, for example peracetic acid, with unsaturated fatty acids, such as oleic or linoleic acid, or unsaturated hydroxy-fatty acids, such as ricinoleic acid, and also alkylsulfonic acids having at least 8 carbon atoms and alkylarylsulfonic acids having at least 3 carbon atoms in the alkyl chain, such as dodecylbenzenesulfonic or dibutylnaphthalenesulfonic acids and alkali metal, alkaline earth metal or ammonium salts thereof.

Also fatty acid partial esters, containing oxyethylene groups, of polyhydric alcohols, such as polyoxyethyleneglycerol monostearate; polyoxyethylenesorbitan monolaurate,-monooleate-monopalmitate or-monostearate; polyoxyethylene esters of fatty alcohols or aromatic hydroxy compounds; polyoxyalkylene esters of fatty acids and polypropylene oxide/polyethylene oxide condensation products. Although cationic emulsifiers also produce sinterable molding compositions, they can be used less advantageously in the polymerization, since they cause long polymerization time, so that they require an excessively high addition of initiator in order to enable operations to be carried out reasonably economically. It is also possible for mixtures of different emulsifiers to be present in the polymer mixture.

In general, an emulsifier content in the polymer mixture of 0.05 to 0.5% by weight is sufficient to obtain good sintered moldings, for example separators for electric cells, but the mixture of polymers can contain up to 5% by weight of emulsifier without an appreciable loss in quality. It is therefore also possible to employ, as the component II, a fairly large proportion of a vinyl chloride polymer prepared by emulsion polymerization and having a comparatively high emulsifier content of, for example, 4% by weight, relative to the polymer, without this having a disadvantageous effect on possible use in the polymer mixture.

It is advantageous for the polymer mixture to contain, either instead of the emulsifier or in addition to the latter, 0.05 to 0.5% by weight, relative to the mixture, of at least one water-soluble wetting agent containing a quaternary nitrogen atom which forms a salt with a carboxylic or sulfonic acid group. Below 0.05% by weight, the capillary rise required for good quality of separator plates is not achieved; above 0.5% by weight, no further improvement in the action of the wetting agent is observed, on the contrary, at high wetting agent contents, difficulties can arise through foaming if the separator plates are employed in electric cells in which a gas is evolved when the batteries are used or during charging. Good results are obtained if the molding compositions contain 0.01 to 0.1% by weight of at least one of the wetting agents described. The wetting agent used should be adequately soluble in water, i.e. to the extent of more than 2% by weight at 20° C. and should contain 12 to about 50 carbon atoms and a quaternary nitrogen atom which forms a salt with a carboxylic or sulfonic acid group. A "quaternary nitrogen atom" is to be understood as meaning a nitrogen atom which carries a positive charge and actuates 4 bonds, of which 1 to 4 are bonds with carbon atoms and the remainder (3 to 0) are bonds with hydrogen atoms.

It is preferable to employ compounds of the following formulae as wetting agents:

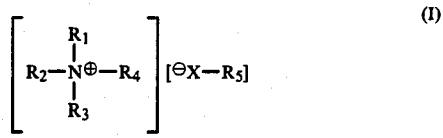

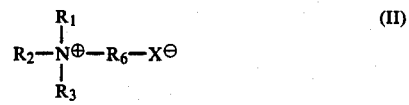

in which

X denotes a —COO⁻ or an —SO₃⁻ group, $R_1$ denotes hydrogen or an alkyl or arylalkyl group, $R_2$, $R_3$ and $R_4$ each denote an alkyl or arylalkyl group which can optionally be interrupted by ether oxygen bridges in the alkyl chain, in particular in such a manner that —$C_2H_4O$—or —$C_3H_6O$—groups are present in the chain;

$R_5$ denotes an alkyl or alkylaryl radical and $R_6$ denotes an alkylene radical, all the radicals $R_1$ to $R_6$ and, if appropriate also X together containing 12 to about 50 carbon atoms and at least one of the radicals $R_1$ to $R_4$ and the radical $R_5$ each containing at least 8 carbon atoms.

Mixtures of several of the wetting agents described in detail above can also be used.

The wetting agent(s) can be present at as early a stage as the polymerization and working up in one or more of the polymers present as the component I and/or as the component II in the mixture of polymers according to the invention.

For example if these polymers have been prepared in accordance with U.S. Pat. Nos. 4,137,381 or 4,323,661 or European Published Application No. 111,917.

If the surfactant content present in the polymers used as component I and II, from their preparation, is not adequate, further surfactant within the limits of the quantity ranges indicated above is added to the mixture of polymers as a solution or dispersion or as a solid in a finely divided state, it being advantageous to agitate the mixture of polymers in order to achieve uniform distribution. If appropriate, the mixture of polymers is then dried The K value of the polymers used in the mixture according to the invention is within the range from 55 to 90. At a K value below 55 and above 90 the mixture of polymers is more difficult to process and, in general, produces sintered plates of a poorer quality.

The bulk density of the mixture of polymers is advantageously within the range from 400 to 700 g/l. In general, lower bulk densities result in a lower manufacturing output and in plates having coarser pores and inferior mechanical properties; higher bulk densities result, in general, in plates having an undesirably high electrical volume resistance. It is preferable to employ mixtures of polymers having a bulk density of 450 to 600 g/l.

For the production of sintered plates used as separators for electric cells, the mixture of polymers should have an average particle size (average particle diameter), measured by sedimentation analysis, of 10 to 50 μm. Above an average particle size of 50 μm the plates produced tend to have coarse pores to an increasing extent; below an average particle size of 10 μm it is, in general, too difficult to produce plates which are still adequately permeable. It is preferable to employ mixtures of polymers having an average particle size of 20 to 35 μm. Sedimentation analysis is advisable for determining the average particle size, since it measures particle size ranges below 33 μm more accurately and is less sensitive to disturbances caused by the polymer particles becoming electrostatically charged.

In addition to the constituents described earlier in the text, the mixture of polymers according to the invention also contains residues of activators, suspending agents and, in some cases, further auxiliaries which have been used in the preparation of the polymers.

The mixture of polymers can be used without further additives as a molding composition for the production of sintered moldings. In certain cases it can be advantageous to add small amounts of further substances. The following are possible examples of such added substances: antioxidants, heat stabilizers, pigments and agents for improving the antistatic properties, and acids.

It is particularly advantageous to employ the mixture of polymers according to the invention for the production of separator plates for electric cells.

As already mentioned earlier in the text, the new mixture of polymers is particularly suitable for the production of separator compartments, since it exhibits good flexibility compared with flexible sintered plates according to the state of the art, an improved tensile strength and an extended sintering temperature range, as a result of which it is easier to adjust the desired low volume resistance of the plate, and the machine-processability of the separator compartments is improved.

The examples and comparative tests below are intended to illustrate the invention in greater detail. For the sake of clearness, the test results have been collated in a table. The various properties were determined by the following methods:

K value: as specified in DIN 53,726
Bulk density: as specified in DIN 53,468
Particle size distribution: by means of air jet sieve analysis as specified in DIN draft No. 53,734.
Average particle diameter: by sedimentation analysis using the following procedure: 1.82 grams of polyvinyl chloride are dispersed in 600 ml of 0.09 percent strength sodium pyrophosphate solution which has been thoroughly degassed, and the sedimentation tendency is measured using a Sartorius model 4600 sedimentation balance at a feed rate of the recording chart of 120 mm/hour. The calculation is carried out using the known Stokes' formula and gives the particle radius. The latter is evaluated using the Rosin-Ramler and Sperling particle size grid.

Determinations carried out on the sintered plate

Preparation of the sintered plates: Separator plates for electric cells are produced on a continuous belt-sintering plant. In this process polyvinyl chloride powder is applied in a specific layer thickness to an endless steel conveyor belt and is sintered by being passed through an oven in which the air temperature is set at 225° C. by means of electrical heating. The dwell time in the sintering zone and hence the intensity of sintering of the PVC powder can be controlled by varying the belt speed. The dwell time is adjusted to values between 2.0 and 2.3 minutes. The separator plates have a sheet thickness of 0.25 mm and a rib thickness of 0.5 mm.

Elongation at break and tensile strength:

The elongation break (elongation when breaking force applied) and the tensile strength are determined by a method modeled on DIN Specification 53,455—tensile testing of plastics. Since no standardized test specimens are available, test pieces of dimensions 60×140 mm are cut out of the sintered plates. The testing is carried out on a tensile testing machine in accordance with the general conditions for tensile testing machines (DIN 51,220, Class 1 and also DIN 51,221), after storage for 16 hours in a standard atmosphere (DIN 5,001) at 23°±2° C. and 50±5% relative humidity. The testing speed (the speed at which the two clamping jaws move apart) is 50 mm per minute ±10%. The force measurement range is 10 N. The force and the elongation are recorded on an indicator roll via a recording mechanism. The feed proportional to elongation (indicator paper: traverse) is adjusted to a magnification of 5 to 1. The elongation is relative to a free clamped length of 100 mm.

Electrical resistivity:

The electrical resistance of separators is determined by measuring the so-called internal resistance of cells, which is measured in a test set-up (battery cell) specially made for the purpose. The difference in the cell resistance with and without the separator gives the resistance of the separator. The volume resistivity in $\Omega$ cm is determined by multiplying by the quotient of plate area divided by plate thickness.

The test cell itself comprises a positive plate and a negative plate ($PbO_2$ and Pb), which are mounted parallel to one another at a distance of 7 mm. The electrodes are plates of the same size and design as are used in the lead accumulator. The separator is located exactly between the electrodes, in a window-shaped recess of dimensions 100×100 mm. The test cell is filled with sulfuric acid of density 1.28 $g/cm^3$ and is fully charged. The measurement of such low-resistance internal resistance values is carried out by means of a direct-reading microhm meter (model EMT 326, made by Elektromesstechnik E. Franz, KG, Lahr), which is connected to the two electrodes. It is carried out by means of mains alternating current.

Capillary rise

Determination of the capillary rise is used as a criterion of the wettability of the separator plates and to characterize their porosity. In the determination, a strip 1 cm wide of the separator is placed in a test-tube filled to a depth of 1.5 cm with water. The level of wettability in millimeters after an immersion time of 10 minutes is quoted as the capillary rise.

Bending angle:

Test specimens of dimensions 90×140 mm are cut out from the sintered plates produced as described earlier in the text, in such a way that the ribs run parallel to the cut edge 140 mm long. This test specimen is clamped in such a way between two flat metal plates which are each 2 mm thick and have the dimensions 120×100 mm and are placed coincidentally on top of one another, that about half of the test specimen projects beyond the plates, and the ribs of the test specimen run perpendicularly to the edges of the two metal plates beyond which the test specimen projects. The two metal plates are arranged horizontally, and the ribs of the test specimen should face downwards. The edge of the upper metal plate beyond which the test specimen projects is rounded to form a semicircle. The projecting portion of the test specimen is then bent upwards through a specific, preselected angle in the course of 2 seconds around this edge.

The bending is effected by using a further metal plate which engages the projecting portion of the test specimen from below and turns through the preselected angle. When the turning is complete, the point of the test specimen which has been bent around the rounded edge of the upper metal plate is checked for cracks. If such cracks occur, the plate is unusable. The determination is carried out at room temperature and about 60% relative humidity. A preliminary test is used to determine the approximate bending angles at which the first cracks occur. The more accurate measurement is begun 30° below the angle deter-mined by the preliminary test. When 5 test specimens successively have withstood the bending without cracks, the bending angle is increased by 10° and a further 5 test specimens are then examined. This procedure is continued until at least one crack occurs on a test specimen. The greatest bending angle at which cracks do not yet occur is shown in the table below.

Comparison test A

A vinyl chloride suspension homopolymer of K value 65, prepared by the process of U.S. Pat. No. 3,951,883, is employed. N-Coconutalkyl-N,N-dimethylbetaine, as described in greater detail below, was added after the polymerization. The polymer contained in its polymer component 100% by weight of polymerized vinyl chloride units; the nature and amount of the surfactants present in the polymer are indicated in the table below, as are also the properties of the polymer and of the sintered plates produced therefrom. The polymer is marked a in the table.

Comparison test B

The polymer used is a graft copolymer of K value 70 which has been prepared by suspension polymerization in accordance with European Published Application No. 111,917 and which contains the following polymerized units in its polymer component: 78.2% by weight of vinyl chloride, 16.3% by weight of ethylhexyl acrylate, 0.65% by weight of ethylene and 4.85% by weight of vinyl acetate.

The ratio of polymerized units of vinyl acetate to those of ethylene is 7.46:1. The sum of the amounts of polymerized units of ethylhexyl acrylate, ethylene and vinyl acetate constitutes 21.8% by weight of the total polymerized units. The nature and amount of the surfactants present in the polymer is indicated in the table below, as are also the properties of the polymer and of the sintered plates produced therefrom. The polymer is marked b in the table below.

EXAMPLES 1 to 3

The examples illustrate the effectiveness, according to the invention, of mixtures of the polymers a and b described earlier in the text in various mixing ratios. The properties of each of the mixtures and of the sintered plates produced therefrom are shown in the table below.

EXAMPLE 4

This example was carried out using a mixture of equal parts by weight of the polymer b described earlier in the text and a vinyl chloride homopolymer of K value 71, produced by emulsion polymerization and containing, in its polymer component, 100% by weight of polymerized units of vinyl chloride and, in addition, the sodium salts of an alkanesulfonic acid mixture described in greater detail later in the text, as an emulsifier, and also an ethylene oxide/propylene oxide block copolymer. Additionally, the mixture also contains a mixture of saturated monocarboxylic acids of chain lengths $C_{16}$ to $C_{18}$. The last-mentioned emulsion vinyl chloride homopolymer is marked d in the table below. This table also contains the properties of the whole mixture and of the sintered plates produced therefrom.

Comparison test C

The polymer used for this test, similarly to comparison test B, was a graft copolymer of K value 75, prepared by suspension polymerization and containing the following polymerized units in its polymer component: 82.7% by weight of vinyl chloride, 16.2% by weight of ethylhexyl acrylate, 0.65% by weight of ethylene and 0.45% by weight of vinyl acetate. The amount of polymerized vinyl acetate used is 4.8/7 of the amount of polymerized ethylene units. The sum of the polymerized amounts of ethylhexyl acrylate, ethylene and vinyl acetate constitutes 17.3% by weight of the total polymerised units. The polymer also contains 3 surfactants, the nature and amount of which is indicated in the table below, and also 0.05% by weight, relative to the polymer, of phosphoric acid. The polymer is marked c in the table below; the properties of the polymer and of the sintered plates produced therefrom can also be seen from the table.

EXAMPLE 5

A mixture of equal parts of polymers c and a, as described in greater detail earlier in the text (see comparison tests C and A), is used for this example. The properties of the mixture and also those of the sintered plates produced therefrom are shown in the table below.

The abbreviations in line 1 of the table below have the following meanings:

| | |
|---|---|
| % by weight = | percent by weight, relative to the polymer mixture containing the surfactant |
| % by weight* = | percent by weight, relative to the whole molding composition |
| BD = | bulk density |
| φ = | diameter |
| TS = | tensile strength |
| EB = | elongation at break |
| VR = | volume resistivity |
| CR = | capillary rise |
| BA = | bending angle. |

The abbreviations indicated in the second and fourth vertical columns, relating to the nature of the polymers used, are explained earlier in the text; the abbreviations in the sixth and eigth columns have the following meanings:

| | |
|---|---|
| CDMB = | N—coconut alkyl-N,N—dimethylbetaine, "coconut alkyl" denoting a mixture of alkyl groups of the following % chain length distribution: $C_8 = 7$; $C_{10} = 6$; $C_{12} = 51$; $C_{14} = 19$; $C_{16} = 8$; $C_{18} = 9$. |
| SDMB = | N—stearyl-N,N—dimethylbetaine |
| DBA = | n-dodecylbenzenesulfonic acid |
| AA = | an n-alkanesulfonic acid having chain lengths varying from $C_{12}$ to $C_{16}$ with a preponderant content of $C_{14}$. |
| AANa = | sodium salts of the mixture of various n-alkanesulfonic acids described above |
| POESL = | polyoxyethylene sorbitan monolaurate |
| EPB = | ethylene oxide/propylene oxide block copolymer |
| CA = | mixture of saturated monocarboxylic acids of chain lengths $C_{16}$ to $C_{18}$ |
| $H_3PO_4$ = | orthophosphoric acid. |

TABLE

| Comparison test Example No. | Components in the polymer mixture ||||||| Further additives || Properties of the mixture |||||
|---|---|---|---|---|---|---|---|---|---|---|---|---|
| | I || II || III || | | | average particle | Particle size distribution % by weight ||
| | Nature | Amount % by weight | Nature | Amount % by weight | Nature | Amount % by weight | Nature | Amount % by weight* | BD, g/dm³ | φ, μm | <33 μm | 33–63 μm |
| A | — | — | a | 99.82 | CDMB | 0.03 | — | — | 420 | 24 | 82 | 12 |
| | | | | | DBA | 0.15 | | | | | | |
| B | b | 99.82 | — | — | CDMB | 0.03 | — | — | 590 | 27 | 63 | 27 |
| | | | | | DBA | 0.15 | | | | | | |
| 1 | b | 74.87 | a | 24.95 | CDMB | 0.03 | — | — | 570 | 28 | 62 | 30 |
| | | | | | DBA | 0.15 | | | | | | |
| 2 | b | 49.91 | a | 49.91 | CDMB | 0.03 | — | — | 540 | 29 | 63.5 | 31 |
| | | | | | DBA | 0.15 | | | | | | |
| 3 | b | 24.95 | a | 74.87 | CDMB | 0.03 | — | — | 490 | 27 | 74.5 | 22 |
| | | | | | DBA | 0.15 | | | | | | |
| 4 | b | 49.32 | d | 49.32 | CDMB | 0.015 | CA | 0.36 | 520 | 27 | 64 | 28.5 |
| | | | | | DBA | 0.075 | | | | | | |
| | | | | | AANa | 1.105 | | | | | | |
| | | | | | EPB | 0.165 | | | | | | |
| C | c | 99.75 | — | — | SDMB | 0.05 | H₃PO₄ | 0.05 | 560 | 24 | 70 | 23 |
| | | | | | AA | 0.003 | | | | | | |
| | | | | | POESL | 0.2 | | | | | | |
| 5 | c | 49.89 | a | 49.89 | CDMB | 0.015 | H₃PO₄ | 0.025 | 500 | 29 | 69 | 27 |
| | | | | | SDMB | 0.025 | | | | | | |
| | | | | | DBA | 0.075 | | | | | | |
| | | | | | AA | 0.0015 | | | | | | |
| | | | | | POESL | 0.1 | | | | | | |

| Comparison test Example No. | Properties of the mixture Particle size distribution % by weight || Properties of the sintered plate ||||
|---|---|---|---|---|---|---|---|
| | 63–125 μm | >125 μm | TS, Nmm⁻² | EB, % | VRΩ·cm | CR, mm | BA |
| A | 5.5 | 0.5 | 11.5 | 5.5 | 5.6 | 127 | 70° |
| B | 9 | 1 | 5.2 | 18 | 10.0 | 77 | 130° |
| 1 | 7 | 1 | 6.0 | 14.8 | 7.6 | 84 | 180° |
| 2 | 5 | 0.5 | 7.1 | 12.1 | 7.2 | 92 | 180° |
| 3 | 3 | 0.5 | 10.2 | 6.6 | 6.5 | 95 | 180° |
| 4 | 7 | 0.5 | 8.6 | 10.9 | 8.8 | 85 | 160° |
| C | 6 | 1 | 3.8 | 16.0 | 7.7 | 82 | 120° |
| 5 | 3 | 1 | 8.3 | 13.4 | 7.5 | 80 | 180° |

We claim:

1. A sinterable, finely particulate molding composition which consists essentially of a mixture of at least two polymers based on vinyl chloride and at least one surfactant, in which each of the polymers has a K value of 55 to 90 and the mixture of polymers has an average particle size of 10 to 50 μm, a bulk density of 400 to 700 g/dm³ and a particle size distribution of 99 to 30% by weight, relative to the mixture, <33 μm, 1 to 60% by weight, relative to the mixture, from 33 to 63 μm, 0 to 9% by weight, relative to the mixture, from 63 to 125 μm and 0 to 1% by weight, relative to the mixture, <125 μm, wherein the mixture contains (I) 95 to 10% by weight, relative to the mixture, of a sinterable copolymer prepared by suspension polymerization in an aqueous phase and in which the polymer component consists essentially of:
(a) 89 to 70% by weight of polymerized units of vinyl chloride,
(b) 10.4 to 29.4% by weight of polymerized units of at least one alkyl acrylate having 3 to 10 carbon atoms in the alkyl group,
(c) 0.3 to 2.5% by weight of polymerized units of ethylene and
(d) 0.3 to 11% by weight of polymerized units of vinyl acetate, subject to the proviso that the amount of (d) is at least 3/7 of the amount of (c) and the sum of the amounts of (b) plus (c) plus (d) is 10 to 30% by weight, wherein said components (c) and (d) can be present as an ethylene/-vinyl acetate copolymer onto which components (a) and (b) fan be grafted;

(ii) 5 to 90% by weight, relative to the mixture, of at least one sinterable polymer in which the polymer consists essentially of:
(α) 100 to 95% by weight of polymerized units of vinyl chloride,
(β) 0 to 5% by weight of polyermized units of ethylene and
(γ) 0 to 5% by weight of polymerized units of vinyl acetate, subject to the proviso that the amount of (γ) is at least 3/7 of (β) and that the amount of (β) plus (γ) is 0 to 5% by weight of the polymer component; and also (III) 0.05 to 5% by weight, relative to the mixture, of at least one water-soluble surfactant, subject ot the proviso that the amounts of I plus II plus III add up to 100% by weight of mixture said mixture providing a molding composition from which sintered plates having improved bending angles can be obtained.

2. A molding composition as claimed in claim 1, wherein at least one surfactant is initially present in said component I or in component II or in both components I and II.

3. A molding composition as claimed in claim 1, wherein at least one surfactant is a constituent of polymers being present as component I and component II in the polymer mixture.

4. A molding composition as claimed in claim 1, wherein the mixture of polymers contains 70 to 20% by weight, relative to the mixture, of the component I described in claim 1, and 30 to 80% by weight, relative to the mixture, of the component II described in claim 1.

5. A molding composition as claimed in claim 1, wherein the polymer component of the component I mentioned in claim 1 is composed of
- (a) 89 to 70% by weight of polymerized units of vinyl chloride,
- (b) 10.7 to 29.7% by weight of polymerized units of at least one alkyl acrylate having 3 to 10 carbon atoms in the alkyl group,
- (c) 0 to 7% by weight of polymerized units of ethylene and
- (d) 0.3 to 11% by weight of polymerized units of vinyl acetate, subject to the proviso that the amount of (d) is at least 3/7 of the amount of (c) and the sum of the amounts of (b) plus (c) plus (d) is 11 to 30% by weight.

6. A molding composition as claimed in claim 1, wherein the polymer component of the component II mentioned in claim 1 is composed of 100% by weight of polymerized units of vinyl chloride.

7. A molding composition as claimed in claim 1, wherein at least one water-soluble surfactant present in the mixture is a surface-active emulsifier which is known for the polymerization of vinyl chloride.

8. A molding composition as claimed in claim 1, wherein the water-soluble surfactant contains a quaternary nitrogen atom which forms a salt with a carboxylic or sulfonic acid group.

9. A molding composition as claimed in claim 1, wherein the mixture contains 0.05 to 2% by weight, relative to the mixture, of at least one water-soluble surfactant.

10. A process for the production of sintered moldings used as separators in electric cells, wherein a molding composition as claimed in claim 1 is sintered for an adequate time at 180° to 250° C., after being shaped.